Jan. 7, 1930.  D. M. BELCHER  1,742,892
CONTROL DEVICE FOR POWER CYLINDERS
Filed March 18, 1926   3 Sheets-Sheet 1

Inventor:
Donald M. Belcher,
by Emery, Booth, Janney & Varney.
Attys.

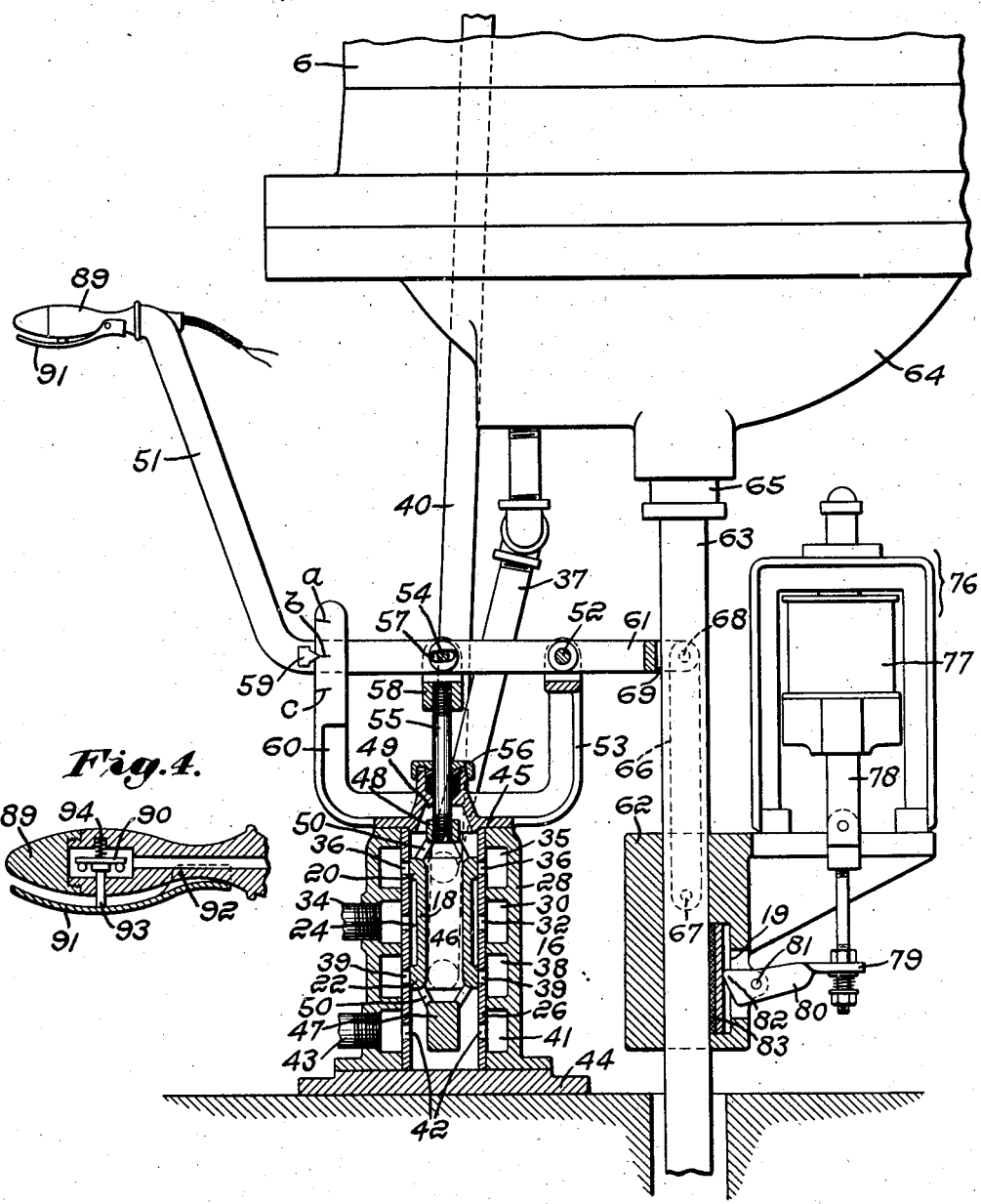

Jan. 7, 1930. D. M. BELCHER 1,742,892
CONTROL DEVICE FOR POWER CYLINDERS
Filed March 18, 1926   3 Sheets-Sheet 3

Inventor:
Donald M. Belcher,

Patented Jan. 7, 1930

1,742,892

UNITED STATES PATENT OFFICE

DONALD M. BELCHER, OF ARLINGTON, MASSACHUSETTS, ASSIGNOR TO COFFIN VALVE COMPANY, OF NEPONSET, MASSACHUSETTS, A CORPORATION OF MAINE

CONTROL DEVICE FOR POWER CYLINDERS

Application filed March 18, 1926. Serial No. 95,745.

This invention aims to provide a simple and efficient control device for power cylinders and more particularly for power cylinders adapted to the operation of relatively large gate or like valves and in the accompanying drawings, wherein I have shown merely for illustrative purposes certain embodiments of the invention, Fig. 1 is a longitudinal section partly in elevation of an apparatus embodying the invention;

Fig. 3 is a vertical section, with certain parts shown in elevation, taken on the line 3—3 of Fig. 2 the parts in said section being shown on a slightly larger scale than in Fig. 2;

Fig. 4 is a detail sectional view of the switch contained in the handle of the manually operating member of the device;

In the accompanying drawings I have elected for convenience to show the invention adapted for the operation of a pivot valve 1 herein mounted upon a shaft 2 arranged within a suitable housing 3. The periphery of the valve 1 is bevelled at 4 to seat against a seat ring 5 embedded within the walls of the housing 3 for engagement by said valve when the latter is turned about its axis to lie transversely of the said housing.

The present invention is principally concerned with the operation of relatively large valves which require greater speed of operation than can be obtained by manual operation.

Figure 1:
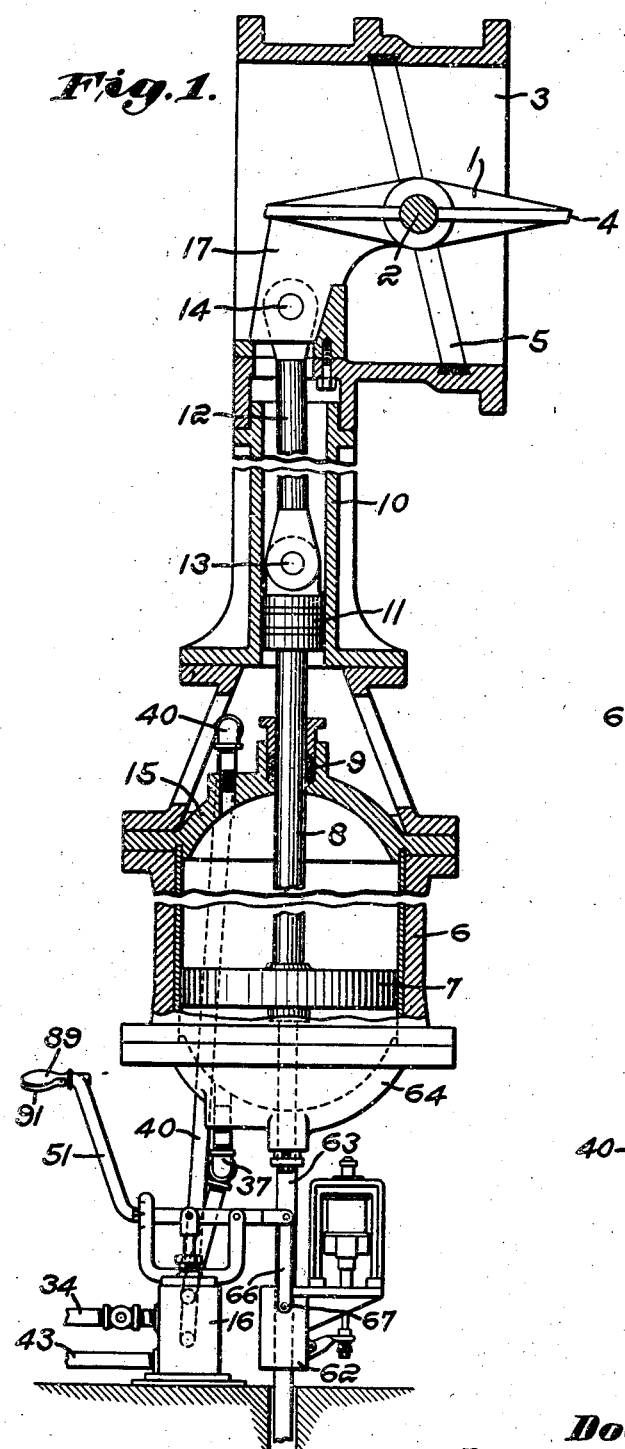
Figure 2:
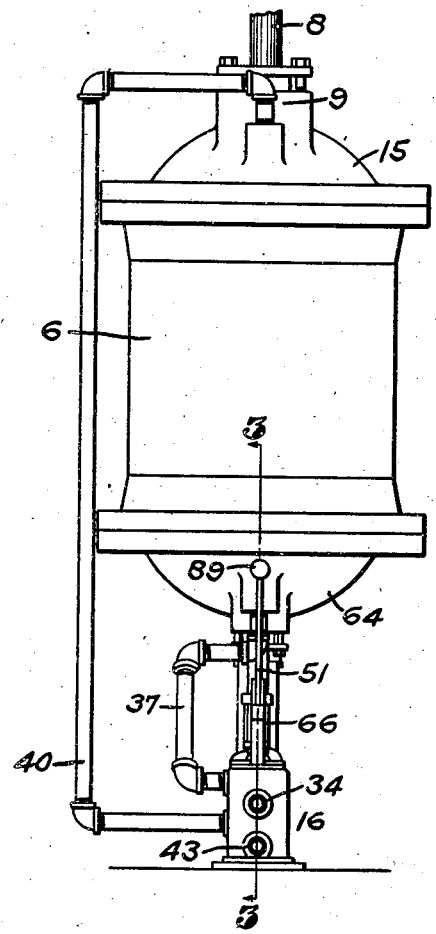
Fig. 2 is a detail side elevation of the gate valve operating device and its controlling mechanism.

In the present example I have illustrated in connection with the operating device of said valve a power cylinder 6 within which a piston 7 is arranged to reciprocate. A piston rod 8 secured to said piston passes through a stuffing box 9 in the cylinder head 15 and into a cylindrical cross head 10 surmounting the cylinder head 15, which cross head is arranged to serve as a guide for an auxiliary piston 11 secured to said piston rod 9 for the purpose of preventing the escape of fluid from the valve housing 3 with which said cross head is directly connected. A link 12 pivotally secured at 13 to the end of the piston rod 8 extends into the valve housing 3 and has pivotal connection at 14 with an arm 17 of the pivot valve 1. By reason of this connection it will be apparent that reciprocations of the piston 7 within the cylinder 6 will rock said valve 1 to and from the fully open position illustrated in Fig. 1 to and from its closed position wherein it extends transversely to said housing.

Any suitable fluid may be employed to operate the piston 7 within its cylinder, as for example water, compressed air, steam or the like, but it is desirable regardless of the type of fluid used that said fluid be admitted at least at times to the cylinder 6 by manually controlled means whereby the valve 1 may be set in a given position there to be maintained automatically until the required amount of water or other fluid has been allowed to pass through the conduit connected with the valve housing 3.

To the above end I have provided a fluid valve structure 16, herein of the sleeve type, wherein is arranged to reciprocate a movable valve member 18. The movable valve member 18 is herein in the form of a sleeve having at opposite ends annular portions 20 and 22 separated by a relatively reduced portion which forms an annular passage 24. The annular portions 20 and 22 herein slidably engage within a relatively fixed sleeve or bushing 26 which is secured against rotary and longitudinal movement within the valve casing 28.

The valve casing 28 is provided with an annular chamber 30 surrounding the fixed sleeve 26 and having communication with the interior of said sleeve through one or more ports 32. The chamber 30 is, in the present example, a pressure chamber to which pressure fluid is supplied through an intake pipe 34. Also within the valve casing 28 and in close proximity to although separated from the annular chamber 30 is a second annular chamber 35 likewise having communication with the interior of the sleeve through one or more ports 36. A pipe 37 provides communication between said annular chamber 35 and one end, herein the lower end, of the cylinder 6. A third annular chamber 38 is arranged in the valve casing 28 adjacent to but separated from the annular intake chamber 30 and this chamber has communication through one or more ports 39 with the interior of said sleeve 26. A pipe 40 also provides communication with said annular chamber 38 and the upper end of the cylinder 6. A fourth annular chamber 41 is arranged in the valve casing 28 surrounding the fixed sleeve 26 and this chamber has communication through one or more ports 42 with the interior of said sleeve, while an exhaust pipe 43 leads outwardly from said annular chamber 41 to any desired point of discharge.

For convenience the valve casing 28 is vertically arranged upon a base 44 which herein closes the lower end of the sleeve 26 and said casing. A cap 45 is secured to the upper end of said casing 28 and closes that end of said casing and likewise the upper end of the sleeve 26.

The sleeve valve 18 is herein hollow having a central passage 46 extending entirely therethrough. The annular portions 20 and 22 of said sleeve valve are so arranged that upon the reciprocations of said sleeve cooperation is effected between the various ports in said relatively fixed sleeve whereby fluid may be admitted to one end or the other of the cylinder 6 while the opposite end of said cylinder from that to which fluid is admitted is opened to effect discharge of whatever fluid remains therein, thus providing means for moving the piston 7 in either direction at will.

To be more specific the annular member 20 of the sleeve valve 18 is wide enough to straddle and completely close the ports 36, or it may be moved to a position either above or below said ports, the space between said ports and the ports 32 being greater than the width of said annular member so that said annular member may stop between the two last mentioned ports leaving both of said ports open. Likewise the annular member 22 is wide enough to straddle and completely close the ports 39, or it may be moved to positions above and below said ports 39. The distance from center to center of the annular members 20 and 22 is herein substantially equal to the distance between the centers of the ports 36 and 39 so that when the sleeve valve is arranged with its upper annular member 20 straddling and closing the ports 36 the lower annular member 22 will be straddling the ports 39 entirely closing said ports so that all fluid entering the pipe 34 to the annular chamber 30 will be allowed to pass only to the annular space 24 surrounding said sleeve valve between said annular members 20 and 22 and be prevented from entering either end of the cylinder 6.

In Fig. 3 the sleeve valve 18 is shown in the aforesaid center position in which it will be balanced cutting off the supply of fluid to both ends of the cylinder 6 and so long as said valve remains in this position the piston 7 will remain stationary and the valve 1 will likewise remain substantially immovable.

It is obviously within the scope of the invention to vary the connections from the annular chambers in the fluid valve housing 28 with the cylinder 6, but in view of the arrangement here shown any movement of the sleeve valve 18 upwardly from the position shown in Fig. 3, will cause the ports 36 to be opened into the annular chamber 24 surrounding said sleeve valve, and thereby permit fluid to pass directly from the intake or pressure chamber 30 through the ports 32, annular chamber 34, thence through the ports 36 to the annular chamber 35 and conductor 37 to the lower end of the cylinder 6. Simultaneously with the uncovering of the ports 36 the uncovering of the ports 39 will take place which will result in providing a clear passage from the upper end of the cylinder 6 through the pipe 40, annular chamber 38, ports 39 and the lower end of the relatively stationary sleeve 26, to the ports 42, annular chamber 41 and exhaust pipe 43, thus causing the piston to close the valve 1.

Movement of the sleeve valve 18 downwardly instead of upwardly will result as before in the uncovering of the ports 36 but instead of providing communication between said ports and the intake pipe 34 communication will be provided between said ports 36 and the interior of the relatively stationary sleeve 26 and through the passage 46 in the hollow sleeve valve 18 to the ports 42 and exhaust pipe 43. The annular rim 22 of said sleeve valve 18 will at this time move downwardly uncovering the ports 39 and providing communication between the intake pipe 34 through the annular space 24 of said sleeve valve, ports 39, annular chamber 38 and pipe 40 to the upper end of the cylinder 6, thus acting upon the piston 7 to move it downwardly into the position shown in Fig. 1, and opening the valve 1. Desirably the sleeve valve 18 is limited in its movement by oppositely arranged abutments, herein an extension 47 at its lower end, adapted to engage the base 44, and a boss 48 at the upper end of said sleeve valve adapted to engage a seat 49 on the end cap 45, said members 47 and 48 being attached to their respective ends of the sleeve valve 18 by spaced legs 50 which permit free circulation of the fluid within the relatively stationary sleeve 26 from one end of said sleeve valve 18 to the other.

It is desirable to provide manual means for effecting the operation of the valve 1 from its open to its closed or partly closed position or vice versa and for this purpose a hand lever 51 is fulcrumed at 52 upon a stationary member, herein an arm 53, extending upwardly from the cap 45, said lever 51 being pivotally connected at 54 with a rod 55 extending through the stuffing box 56 in said cap 45 and into screw-threaded engagement with the extension 48 of said sleeve valve. The pivot pin 54 extends through the lever 51 and into operative relation with elongated openings 57 formed in the upper ends of a bifurcated member 58 herein having screw-threaded engagement with the upper end of the rod 55. By this arrangement the oscillations of the lever 51 about the pivot 52 will effect without cramping the reciprocations of the sleeve valve 18.

The hand lever 51 is herein provided with an index member 59 arranged to cooperate with appropriate indications such as marks $a$, $b$ and $c$ arranged along one face of an upwardly extending arm 60 from the cap 45.

The mark $a$ in the present example indicates the position of the pointer 59 when the sleeve valve 18 is moved to admit steam or other fluid to the lower end of the cylinder 6 and cause the valve 1 to close, the mark $b$ represents the neutral or balanced position of the valve 18 where the ports 36 and the ports 39 are all closed by their respective annular members 22 and 20 respectively, and the mark $c$ represents the position of the valve 18 when fluid is being admitted to the upper end of the cylinder 6 to depress the piston 7 and open the valve 1.

In the present embodiment of the invention the sleeve valve 18 is provided with means tending normally to move the indicator 59 to a position registering with the index mark $a$, in other words to effect the closing of the pivot valve 1. This means is obviously not limited to any specific form but herein I provide an extension 61 arranged upon the opposite sides of the pivot 52 from the handle of said lever 51 and carried by this extension 61 is a weight 62. Desirably this weight is slidably arranged upon a tail rod 63 movable with the piston 7 and extending from said piston through the lower cylinder head 64 of the cylinder 6. A stuffing box 65 is provided to prevent escape of fluid from the cylinder around said tail rod.

To compensate for the variation in the movement between the end of the extension 61 and the weight 62 I provide herein links 66 arranged on opposite sides of the tail rod 63 and pivotally connected at 67 to said weight 62 and at 68 to opposite arms of a fork 69 formed at the end of the extension 61.

From the foregoing description it will be apparent that by manipulation of the manually operable controlling lever 51 fluid may be admitted to one side or the other of the piston 7 so as to operate the valve connected therewith from one position to another and by careful manipulation of said lever 51 by the operator the valve 1 may be held in a given position. But should the operator release his hold upon the controlling lever 51 the weight 62 will be sufficient to effect the movement of the valve 18 to a position where fluid will be permitted to enter the cylinder 6 and move it and the valve 1 connected thereto to a position corresponding to the closed position of said pivot valve 1. There are times however when it is desirable to maintain said pivot valve in a given position for a considerable period of time even though the operator has released his hold upon the controlling arm 51.

In the present example I provide for this purpose means for operatively connecting the weight 62 with said piston desirably through the tail rod 63 so that any fluctuation or movement of said piston after a position has been determined will automatically operate the sleeve valve 18 to counteract any such movement by admitting fluid to the end of the cylinder 6 in opposition to the movements of said piston. For example assuming that the piston 7 is at the lower end of the cylinder 6, as in Fig. 1, it will be apparent that with the weight secured to the tail rod 63 any upward movement of the piston 7 tending to close the valve 1 will raise the end 61 of the operating arm 51 causing the sleeve valve 18 to move downwardly in the relatively fixed sleeve 26. This downward movement simultaneously uncovers the ports 39 permitting fluid to enter from the pressure chamber 30 through the annular chamber 24 to the chamber 38, thence upwardly through the pipe 40 to the upper side of the piston 7 thereby causing said piston to return to its previous position and with it the valve sleeve 18. Before this automatic restoration of the valve 18 can take effect the arm 51 must first have been moved to a position wherein the indicator 59 registers with the neutral indication $b$.

With such an arrangement the valve 1 may be moved to substantially any opening or closing position and be automatically maintained substantially in such position, only slight variations from such positions, due to leakage, fluctuations in pressure or the unbalancing of the valve 1, being required to set the balancing or restoring forces into action.

Although I have described the controlling device of the present invention as applied to gate or like valves, it is to be understoood that the invention is not limited to such application nor is the invention limited to the particular arrangement of the various parts of the device and manner of operating the same as herein shown.

In order that the present invention may be more clearly understood a specific application is disclosed which includes connection with the pump discharge of a water supply system comprising a reservoir 70 into which extends a suction pipe 71 having a usual foot valve 72 arranged at its lower end. Within the section pipe 71 or at least connected therewith is a pump 73, in the present example driven by a motor 74. A pump discharge pipe 75 extends from said pump to the point or points of distribution and in some instances it is necessary to extend said discharge pipe upwardly so that when the motor and pump cease to operate it is desirable to provide a valve in said discharge pipe which will act as a check valve to prevent the return of the water in said pipe 75. In the present example the valve 1 is shown installed in said discharge pipe to act both as a regulator valve and as a check valve and therefore when the pump is in operation it is desirable to have the valve 1 open fully or partially according to the quantity of water it is desired to deliver through the discharge pipe 75.

It is common practice in apparatus of this nature to provide means for stopping the motor and pump from a remote point and this is often done automatically when the supply of water to which the pipe 75 is delivering is fully replenished and in order to prevent the flowing back of the water within said discharge pipe 75 it is desirable that the closing of the valve 1 therein take place immediately upon the stopping of said pump. To this end means are provided for automatically disconnecting the weight 62 from the tail rod 63 which means herein include a solenoid 76 which for convenience is mounted upon and movable with the weight 62.

The solenoid 76 includes a coil 77 and an armature 78 secured to one end 79 of a lever 80 pivoted herein at 81 to the weight 62. An arm 82 extends through a recess 19 in one side of said weight into engagement with a friction plate 83 arranged in contact with the tail rod 63. The arrangement of several parts of the solenoid and connections are such that when the coil 77 is energized the armature 78 will be moved upwardly, in Fig. 3, tilting the lever 80 and causing the arm 82 to firmly press the friction plate 83 against said tail rod and cause the weight 62 and tail rod to move as one, but the moment said coil 77 is deenergized the weight of the armature 78 thereof will cause the lever 80 to rock about its pivot 81, releasing the plate 83 from said tail rod and by so doing permitting the weight 62 to drop and carry with it the arm 61. The dropping of the arm 61 effects the raising of the valve 18 so as to supply fluid to the lower end of the cylinder 6 and cause the piston 7 to move upwardly in the cylinder to close the valve 1.

In the general operation of the apparatus the motor operating pump 73 is preferably first set into operation by the closing of a switch such for instance as that shown at 84 before the valve 1 is opened so that pressure may be supplied in the discharge pipe 75 to prevent the return of the water remaining in said pipe. The closing of said motor circuit also energizes the solenoid coil 77 by reason of the connection of said coil by a conductor 85 with one feed wire 86 of the motor circuit and by a second conductor 87 leading to the other feed wire 88 of said motor circuit. The second step in the operation of the apparatus is to move the hand lever 51 from the intermediate position $b$ to the opening position $c$ (see Fig. 3). It will however be apparent that when the solenoid coil 77 is energized by the closing of the switch 84, the weight 62 will be operatively connected to the tail rod 63 and so prevent manual movement of the operating lever 51 without moving the piston 7 and valve 1. It is therefore desirable that connection between the weight 62 and said tail rod 63 be temporarily broken until the valve 18 has been set properly to move the piston to the desired position within the cylinder 6.

To facilitate the disconnecting of the weight 62 from the tail rod 63 the handle 89 of the lever 51 is provided with a switch 90 which is embedded in said handle for operation by a latch 91 pivoted at 92 to said handle and acting through a pin 93 to break the circuit including said solenoid coil 77 when the operator grips said handle and latch. Upon the release of said handle the spring 94 causes the switch to close and restore the operative connection between said weight and tail rod. The switch 90 is included in the circuit of the conductors 85 and 87 by means of a conductor 95.

The valve 1 may be manually closed as well as manually opened by gripping the handle 89 and the latch 91 as hereinbefore stated, first deenergizing the solenoid coil 77 and thereby breaking the connection between the weight 62 and said tail rod, but in whichever direction the piston is moved if it is desired to maintain said piston and the valve connected therewith in any given position the lever 51 must be returned to its neutral position immediately following the arrival of the piston at the position desired, and with the release by the operator of said handle 89 and latch 91 the automatic operation of the valve 18 begins and continues so long as the electric circuit including said solenoid coil 77 remains energized, unless the operator again grips the handle 89 and disconnects the weight from the tail rod. The moment the circuit of said motor is broken by whatever cause the solenoid coil 77 becomes deenergized and the weight 62 permitted to act directly upon the valve 18 to cause the piston 7 to move the valve 1 to its fully closed position.

Figure 6:
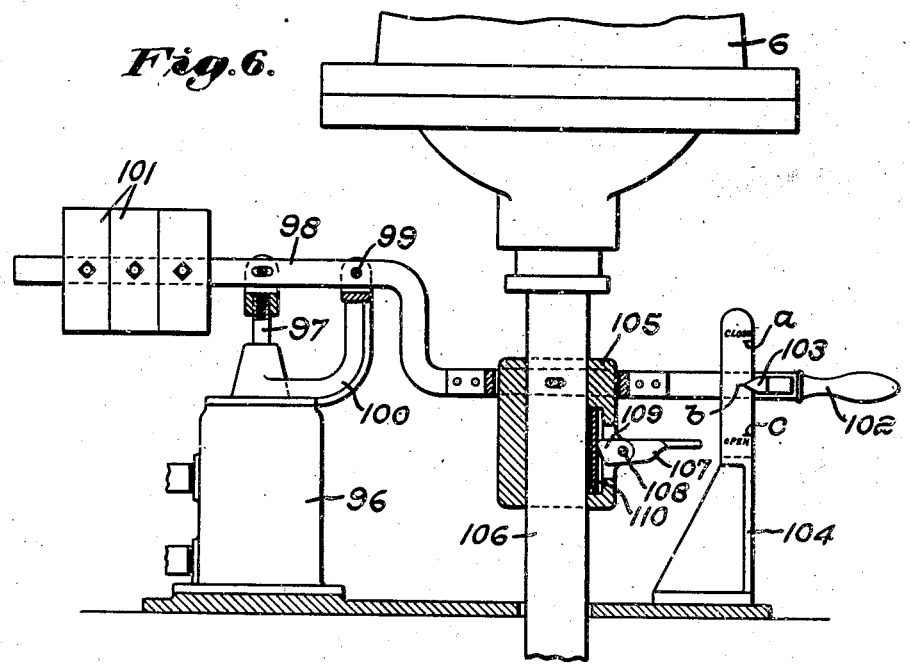
Fig. 6 is a detail view partly in section of a modified form of control.
Figure 5:
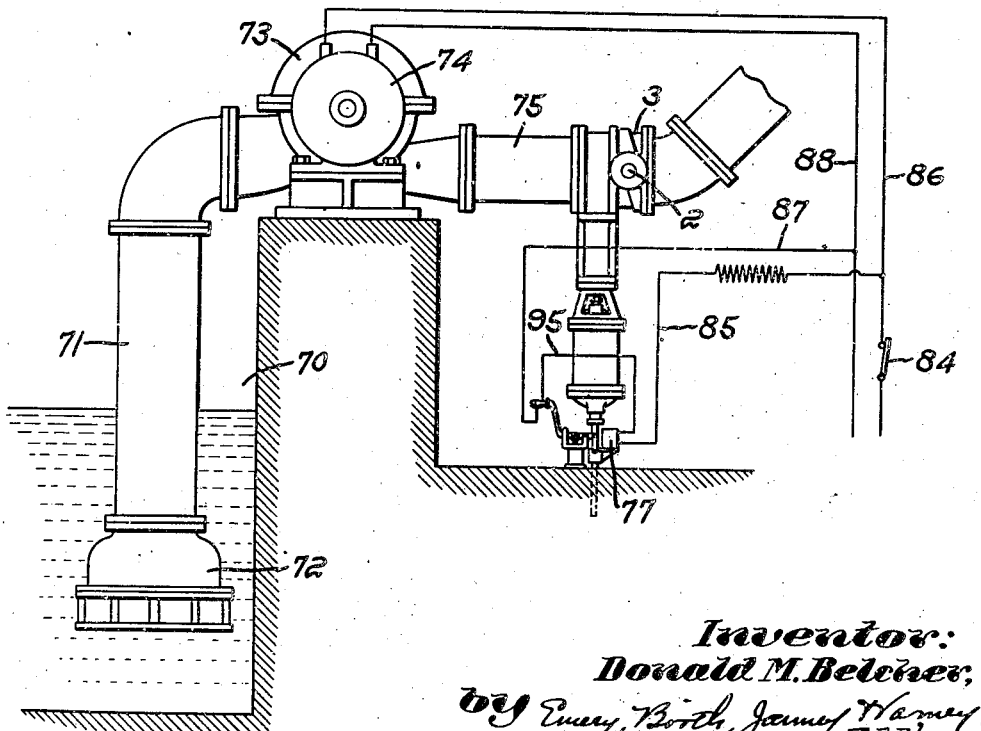
Fig. 5 is a diagrammatic view illustrating the application of the controlling device to the discharge end of a hydraulic pump.

In Fig. 6 I have illustrated a modified form of controlling device wherein a control valve 130

96 substantially similar to the valve 16 of the preceding form is employed, said valve being provided with the valve stem 97, similar to the valve stem 55 of the foregoing structure, which is connected to an operating lever 98 pivoted at 99 to an upstanding arm 100. The arm 98 carries weights 101 tending normally to operate the control valve 96 to admit fluid to the cylinder 6, herein for the purpose of closing the valve connected with the piston thereof. The lever 98 has a manually controlled arm 102 provided with a pointer 103 to register with suitable index marks a, b and c upon a standard 104 arranged adjacent to said operating handle. The arm 102 is pivotally secured to a collar 105 slidably mounted upon the tail rod 106 of the valve and arranged to be secured to move with said tail rod, herein by a cam lever 107 pivoted at 108 to said collar and having an end 109 arranged to produce a gripping action between the gripping plate 110 and the side of said tail rod 106. The cam lever 107 is desirably manually operated instead of automatically operated as in the previous case, and when operated to grip said tail rod the piston within the cylinder 6 will be automatically maintained substantially in a given position, but when said lever 107 is moved to release the collar 105 from said tail rod the weights 101 act to raise the arm 102 to the "close" position permitting fluid to enter the cylinder 6 and move the piston therein to close said valve 1.

Although I have disclosed and discussed in detail certain full and complete embodiments of my invention it is to be understood that the invention is not limited thereto.

Claims:

1. The combination with a cylinder, a piston arranged in said cylinder, a valve for controlling the operations of said piston in said cylinder, manual operating means for said valve means for operatively connecting said valve with said piston whereby said valve may be moved to automatically maintain said piston substantially in a given position in said cylinder and means operable upon the gripping of said manual means to disconnect said control valve and piston.

2. The combination with a fluid actuated piston, of a fluid valve for controlling the movements of said piston, manual means for setting said valve in a selected position and disconnectable means operatively connecting said valve with said piston arranged to be operated by said movements of said piston to restore the latter to a selected position, said manual means including electrical means arranged to function upon the gripping thereof by the operator to disconnect said valve from said piston.

3. The combination of a gate or like valve, a fluid actuated piston for opening and closing said valve, a piston rod for said piston, a fluid control valve for controlling the movements of said piston, an electrically operated instrument, means normally tending to move said fluid control valve to a position to cause said piston to close said gate or like valve, and electro-magnetic means for operatively maintaining interruptable connections between said piston rod and said fluid control valve to maintain said gate valve in open or partly open position, said electro-magnetic means being disconnectable when the current to said electrically operated instrument is cut off, whereby said means normally tending to operate said fluid control valve is permitted to function.

4. In combination, a supply valve, a control valve, manual means for moving said control valve to a position to effect the opening or closing of said valve, means tending normally to move said control valve to valve closing position, means for operatively connecting said control valve with said supply valve whereby fluctuating movements of said supply valve from a given position will effect movements of said control valve to restore said supply valve to said given position and electrical instrumentalities operable upon the grasping of said manual moving means by the operator to interrupt the operative connection between said control valve and said supply valve.

5. In combination, an electric circuit, a valve, power means for operating said valve, a control valve for said power means, electromagnetic means in said circuit arranged when energized to effect operative connection between said valve and said control valve automatically to maintain said valve substantially in a given position, and means effective upon the interruption of current to said electric circuit to close said valve.

6. In combination, a conduit, an electric circuit, a valve in said conduit constituting a check valve designed to regulate the output from said conduit, power means for operating said valve, a control valve for said power means, electromagnetic means in said electric circuit arranged when energized to effect operative connection between said valve and said control valve automatically to maintain said valve substantially in a given position, and means effective upon the interruption of current to said electric circuit to close said valve.

7. In combination, a valve manually operable means for setting said valve in a given position, an electric circuit, means in said circuit operable when said circuit is closed automatically to maintain said valve in a given position, and switch means opened by the gripping of said manual means to render ineffectual the automatic position maintaining means of said valve during the manual operation of said valve.

8. The combination with a fluid operated device including an operated member, a control valve for admitting fluid to said device, manual operating means for said control valve, an electric circuit including a magnet, means operated by said magnet when said circuit is closed to maintain operative connections between said control valve and the operated member of said device whereby fluctuating movements of said device may automatically be overcome by admitting fluid to said device.

9. The combination with a fluid operated device including a piston, a control valve for regulating the admission of fluid to operate said piston, manual means to operate said valve, interruptable connections between said control valve and said piston to effect automatic operations of said control valve whereby said piston may be maintained approximately in a selected position, an electric circuit, a magnet included in said circuit arranged when energized to maintain said control valve operatively connected with said piston, and switch means operable upon the grasping of said manual means to open said electric circuit and interrupt connections between said control valve and piston.

In testimony whereof, I have signed my name to this specification.

DONALD M. BELCHER.